United States Patent
Perna et al.

(10) Patent No.: US 7,799,451 B2
(45) Date of Patent: *Sep. 21, 2010

(54) POST-REFORMER TREATMENT OF REFORMATE GAS

(75) Inventors: Mark A. Perna, Alliance, OH (US); Milind V. Kantak, Mayfield Heights, OH (US); Daniel P. Birmingham, Canton, OH (US); Gregory C. Rush, Canton, OH (US); Crispin L. DeBellis, North Canton, OH (US)

(73) Assignee: Rolls-Royce Fuel Cell Systems (US) Inc., North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/315,551

(22) Filed: Dec. 4, 2008

(65) Prior Publication Data

US 2009/0123800 A1 May 14, 2009

Related U.S. Application Data

(63) Continuation of application No. 10/913,057, filed on Aug. 5, 2004, now Pat. No. 7,510,793.

(51) Int. Cl.
*H01M 8/04* (2006.01)
(52) U.S. Cl. ........................................... 429/20
(58) Field of Classification Search .................. 429/20
See application file for complete search history.

(56) References Cited

U.S. PATENT DOCUMENTS 5,628,931 A 5/1997 Lednor et al.

(Continued)

FOREIGN PATENT DOCUMENTS

CA 2250893 10/1997

(Continued)

OTHER PUBLICATIONS

CO2 Reforming and Partial Oxidation of Methane, Topics in Catalysis, Baltzer Science Publishers, 1996, vol. 3, No. 3/4, pp. 299-311.

*Primary Examiner*—Wayne Langel
(74) *Attorney, Agent, or Firm*—Krieg DeVault LLP; Matthew D. Fair, Esq.

(57) ABSTRACT

A method of modifying reformate gas composition downstream of the reformer so that it remains in a carbon-free region, i.e. above the critical oxygen/carbon ratio even at the desired minimum operating temperature. This is accomplished by using staged partial oxidation in a partial oxidation chamber downstream of the reformer. A small amount of air (or oxygen) is added. The net result is an increase in the oxygen/carbon ratio and, thus, a lowering of the required temperature for soot-free operation. Immediately downstream of this partial oxidation chamber, heat can be removed to cool the gas prior to a second stage of partial oxidation. A second stage partial oxidation chamber produces additional water and further increases the oxygen/carbon ratio and further lowers the required gas temperature for soot-free operation. Further stages of partial oxidation followed by cooling of the gas can be repeated until the oxygen/carbon ratio is sufficiently high to allow soot-free operation at the lowest required operating temperature.

12 Claims, 2 Drawing Sheets

U.S. PATENT DOCUMENTS

| | | | |
|---|---|---|---|
| 6,726,850 B1 | 4/2004 | Reyes et al. | |
| 7,510,793 B2 * | 3/2009 | Perna et al. | 429/17 |
| 2003/0204993 A1 * | 11/2003 | Holland et al. | 48/127.9 |
| 2004/0028964 A1 * | 2/2004 | Smaling | 429/19 |

FOREIGN PATENT DOCUMENTS

| | | |
|---|---|---|
| EP | 0842894 | 5/1998 |
| GB | 2274284 | 7/1994 |
| WO | WO 01/51412 | 7/2001 |

* cited by examiner

POST-REFORMER TREATMENT OF REFORMATE GAS

CROSS REFERENCE TO RELATED APPLICATIONS

The present application is a continuation of U.S. patent application Ser. No. 10/913,057 filed Aug. 5, 2004, now U.S. Pat. No. 7,510,793 which is incorporated herein by reference.

BACKGROUND OF THE INVENTION

1. Field of the Invention

The invention is generally related to fuel reformers and more particularly to the treatment of the gas produced by a catalytic partial oxidation fuel reformer.

2. General Background

In most fuel cell systems including solid-oxide (SOFC) and proton-exchange membrane (PEM) fuel cell types, a hydrogen-rich gas is used to produce energy in the form of electricity and heat. When using a fuel other than pure hydrogen, a fuel reformer or fuel processor is required. A fuel reformer is a device that produces hydrogen from carbonaceous fuels such as natural gas, propane, gasoline, methanol, ethanol, or naphtha. A reformer combines fuel with a substoichiometric amount of oxygen (air) to produce hydrogen and carbon monoxide for use in a fuel cell. The oxidation of the fuel releases heat, which may be captured and used elsewhere in the system. Water in the form of superheated steam is typically added with the feed streams to further react to yield the products and absorb heat.

It should be noted that any reformer can be operated in a catalytic partial oxidation (CPOX) mode by adjusting the feed conditions. The reformer feed conditions are typically characterized by two ratios; steam-to-carbon (steam/carbon) and air-to-fuel (oxygen/carbon, $O_2/C$) molar ratios. The CPOX reformer generally operates in steam/carbon and oxygen/carbon ranges of 0.0-2.5 and 0.5-0.7, respectively. These feed conditions may overlap with another form of reforming known as the Autothermal Reforming (ATR). The CPOX feed ratios are such that the overall reforming process is net exothermic. It is common practice for companies that operate reformers in a mode that is very similar to catalytic partial oxidation (CPOX) to put a different name on the reformer and process for the sake of having a unique name to distinguish themselves in the marketplace. For example, one company that operates its reformers at CPOX conditions calls it an Autothermal or ATR reformer. While proprietary or brand names may be different, the CPOX mode of reformer operation is characterized by partial oxidation that releases heat as described above.

There are some technical issues that must be addressed to improve the practicality and commercial nature of fuel cells. A need for an external water supply presents limitations, particularly for mobile applications where size and weight are critical. An external water supply also presents freezing problems in a cold climate. Depending on the reformer operating conditions, the product gas (typically hydrogen, carbon dioxide, carbon monoxide, nitrogen, methane) may have a tendency to form carbon if not maintained at elevated temperatures. Carbon (or soot) formation in flow lines, components, and fuel cell flow fields is detrimental to the system operation. Moreover, carbon deposition becomes critical during system start-up and shutdown conditions. Thermodynamically, the onset of carbon formation is a function of temperature, oxygen/carbon as well as steam/carbon ratios. The tendency to produce carbon gets severe at CPOX conditions, especially in waterless (steam/carbon=0) mode. The reformer operating condition determines the propensity towards carbon formation. Thus, developing a means of lowering the operating temperature while also preventing the formation of soot is a desirable goal in the area of all reformers and especially CPOX fuel reformers.

SUMMARY OF THE INVENTION

The invention addresses the above need. What is provided is a method of modifying the reformate gas composition downstream of the reformer so that it remains above the critical oxygen/carbon ratio even at the desired minimum operating temperature. This is accomplished by using staged partial oxidation in a partial oxidation chamber downstream of the reformer to modify the reformate composition. A small amount of air (oxygen) is added to the reformed gas and reacts with hydrogen gas, forming water vapor and raising the temperature of the reformed gas via this exothermic reaction. The net result is an increase in the oxygen/carbon ratio and, thus, a lowering of the required temperature for soot-free operation. Immediately downstream of this partial oxidation chamber, the added heat can be removed prior to a second stage of partial oxidation. A second stage partial oxidation chamber produces additional water and further increases the oxygen/carbon ratio and further lowers the required gas temperature for soot-free operation. Further stages of partial oxidation followed by cooling of the gas can be repeated until the oxygen/carbon ratio is sufficiently high to allow soot-free operation at the lowest required operating temperature.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
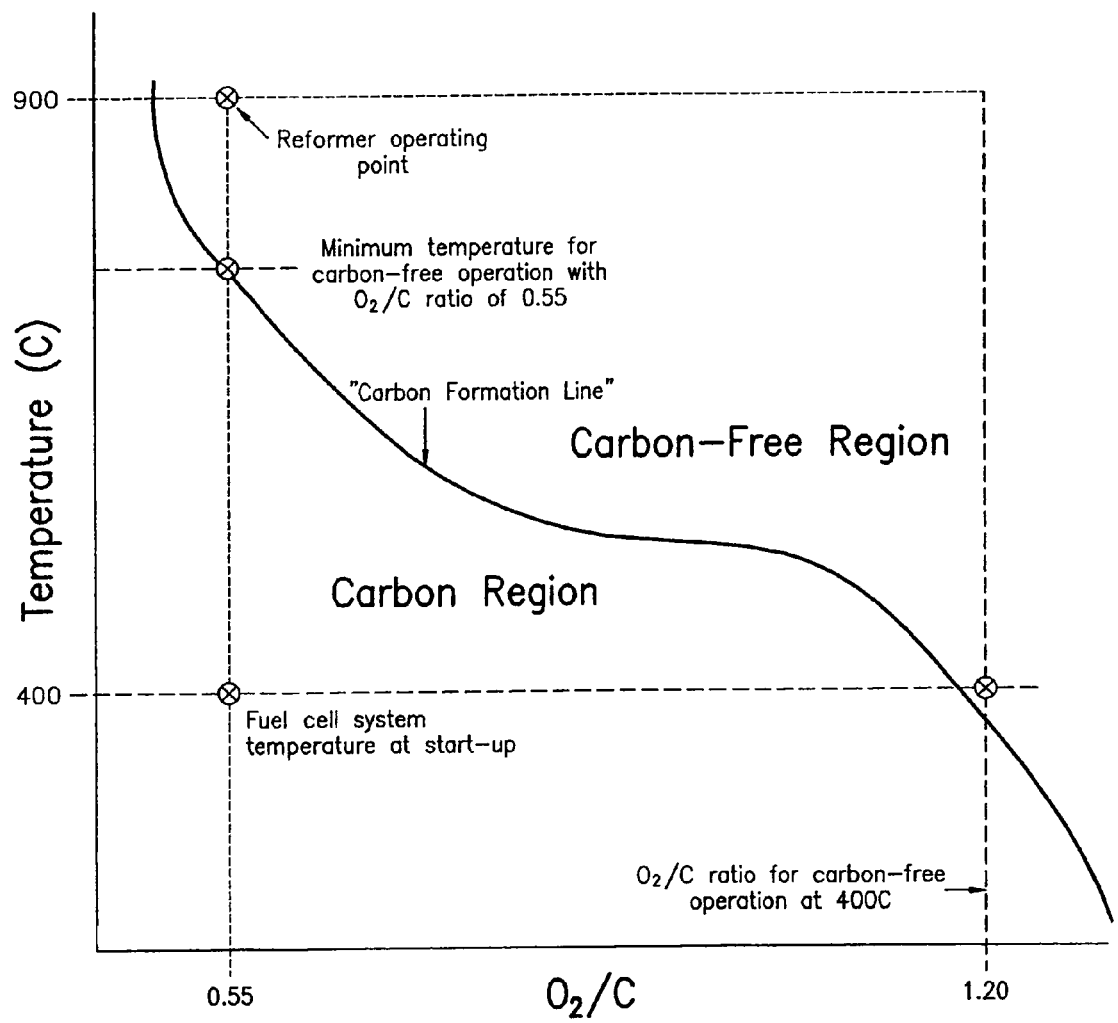
FIG. 1 is a graph that illustrates the relationship of soot formation to gas temperature and oxygen/carbon ratio at equilibrium.

Referring to the drawings, FIG. 1 illustrates the relationship of soot formation to gas temperature and oxygen/carbon ratio. It can be seen that increasing the oxygen/carbon ratio of the reformate gas is favorable for systems that must operate at lower temperatures. To remain in the soot-free (carbon-free) region at four hundred degrees Celsius, an oxygen/carbon ratio of about 1.2 moles oxygen per mole of carbon is estimated.

It is not possible to operate a waterless CPOX (catalytic partial oxidation) reformer to obtain such a high oxygen/carbon ratio in the reformate gas without exceeding the allowable temperature limit of the catalyst/substrate material. The CPOX reformer must operate with an oxygen/carbon ratio in the range of 0.5-0.7 to remain within its allowable temperature limit. However, it is possible to operate at higher temperatures downstream of the reformer using special pipe sections that can withstand higher temperatures.

Figure 3:
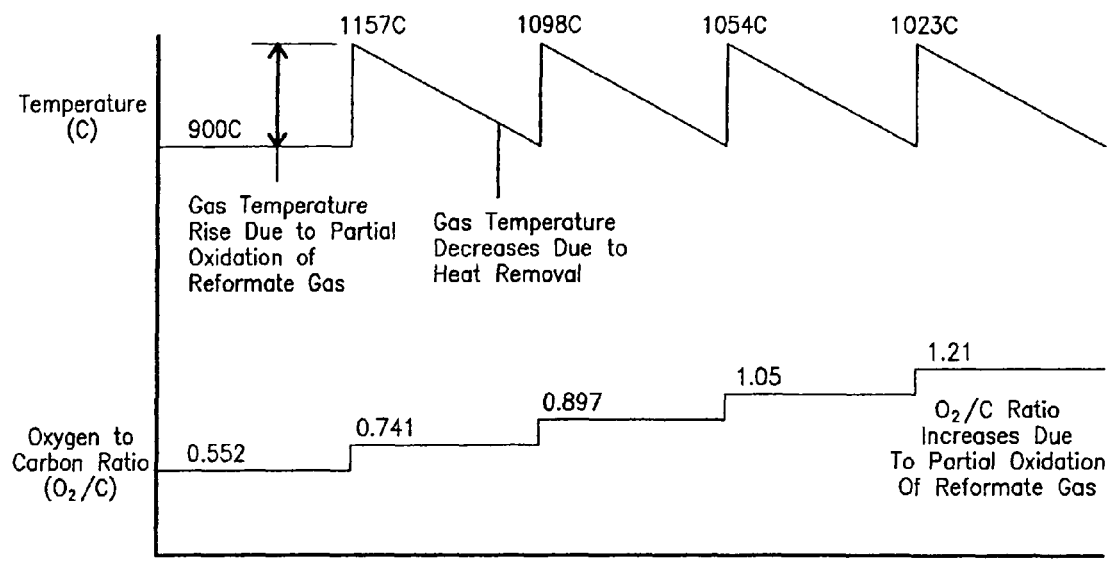
FIG. 3 is a schematic illustration in an example of the effect of the invention on the gas temperature and oxygen/carbon ratio.
Figure 2:
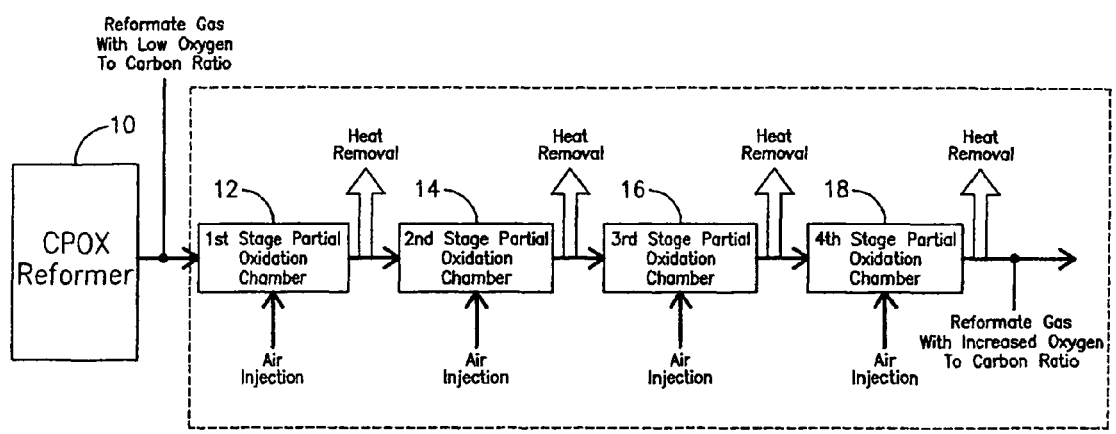
FIG. 2 is a schematic illustration of the method of the invention.

FIGS. 2 and 3 schematically illustrate the principle of the inventive method. The catalytic partial oxidation reformer 10 begins operation at 900 degrees Celsius. The reformate gas from the reformer is directed into a first stage partial oxidation chamber 12. The addition of a small amount of air (oxygen) into the first stage partial oxidation chamber to partially oxidize the reformate gas consumes a small amount of $H_2$ (hydrogen) and produces water. The exothermic reaction causes the gas temperature to increase, as illustrated in FIGS. 2 and 3. A portion of the produced water may be reacted by the available methane ($CH_4$) in the reformate gas and, since this reaction is endothermic, it will tend to limit the temperature rise of the gas. The net result is an increase in the oxygen/carbon ratio and, thus, a lowering of the permissible temperature for soot-free operation.

Immediately downstream of this first stage partial oxidation chamber 12, heat can be removed via inter-stage cooling prior to a second stage of partial oxidation. A second stage partial oxidation chamber 14 will produce additional water and further increase the oxygen/carbon ratio and further lower the permissible gas temperature for soot-free operation. Again, heat removal can be induced to cool the gas following the second stage of partial oxidation. As seen in FIGS. 2 and 3, additional stages of partial oxidation of the gas, followed by cooling of the gas, can be repeated until the oxygen/carbon ratio is sufficiently high to allow soot-free operation at the lowest required operating temperature. The number of stages can be adjusted to obtain a certain desired oxygen/carbon level.

An example of the method of the invention follows. A 10-kWe scale CPOX reformer 10 operating with natural gas and an oxygen/carbon ratio of 0.55 moles oxygen per mole of carbon produces 19.6 $lb_m$/hour of reformate gas containing 31% $H_2$, 14.6% CO, 3.3% $CO_2$, 1.3% $CH_4$, and the balance $N_2$. The exit temperature of the reformer is 900 degrees Celsius. At this oxygen/carbon feed ratio of 0.55, the reformer 10 is well above the minimum temperature required for soot-free operation. During the start-up of a solid oxide fuel cell it is desirable to use this reformate gas to purge the anode side of a solid oxide fuel cell prior to its reaching about 400 degrees Celsius. As seen in the graph of FIG. 1, the oxygen/carbon ratio must be approximately 1.20 for soot-free operation at such a temperature.

The reformate gas from the CPOX reformer 10 is directed into a first stage partial oxidation chamber 12. Approximately 25 SLPM of air is directed into the reformate gas in the first stage partial oxidation chamber 12 located immediately downstream of the reformer. This will cause the adiabatic gas temperature to increase to 1,157 degrees Celsius and will increase the oxygen/carbon ratio of the reformate gas to 0.741 as illustrated in FIG. 3. At this oxygen/carbon ratio, the temperature for soot-free operation is lowered to approximately 650 degrees Celsius. The treated gas from the first stage partial oxidation chamber 12 is cooled to 900 degrees Celsius and then directed into a second stage partial oxidation chamber 14. Approximately 25 SLPM of air is directed into the modified reformate gas in the second stage partial oxidation chamber 14. Again, the gas temperature rises to approximately 1,100 degrees Celsius and the oxygen/carbon ratio now increases to 0.897, further lowering the permissible operating temperature for soot-free operation. As seen in FIGS. 2 and 3, third and fourth stages of partial oxidation indicated by numerals 16 and 18, followed by inter-stage cooling, can be used to increase the oxygen/carbon ratio to the required level of 1.20, which corresponds to the required operating temperature of 400 degrees Celsius in a solid oxide fuel cell. Additional stages of treatment may be used as necessary to obtain a desired oxygen/carbon ratio for carbon prevention.

Approximately 1 kW of heat must be removed following each stage of partial oxidation to cool the modified reformate gas back down to 900 degrees Celsius. This can be accomplished by using a simple coiled tube and allowing the heat to dissipate to the ambient surroundings.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A fuel cell system, comprising:
   a fuel cell having a startup temperature;
   a reformer structured to reform a fuel into a reformate gas;
   a plurality of partial oxidation (POX) chambers arranged in series in fluid communication with the reformer, said plurality of POX chambers operable to treat the reformate gas by successive partial oxidation until a temperature at which soot will form in the treated reformate gas is less than the fuel cell startup temperature; and
   a plurality of heat removal devices in correspondence with said plurality of POX chambers, each heat removal device fluidically coupled to a corresponding POX chamber and structured to remove heat from the gas discharged by said corresponding POX chamber,
   wherein during start-up operation of said fuel cell, said plurality of POX chambers and said plurality of heat removal devices operate to supply the treated reformate gas to said fuel cell at an oxygen/carbon ratio that yields carbon-free operation at the fuel cell startup temperature.

2. The fuel cell system of claim 1, wherein at least one of the heat removal devices is a heat exchanger fluidically coupled to at least one of the reformer and a POX chamber of the plurality of POX chambers for removing heat from the discharged gas.

3. The fuel cell system of claim 2, wherein at least one POX chamber discharges the gas at approximately 1157 degrees (C.), and wherein said heat exchanger reduces the temperature of the treated reformate gas to approximately 900 degrees (C.).

4. The fuel cell system of claim 1, wherein the treated reformate gas entering the fuel cell has an oxygen/carbon ratio of at least 0.55 and a temperature of at least 900 degrees (C.).

5. The fuel cell system of claim 1, wherein the treated reformate gas entering the fuel cell has an oxygen/carbon ratio of at least 1.2 and a temperature of at least 400 degrees (C.).

6. The fuel cell system of claim 1, wherein said reformer is structured as a waterless reformer.

7. The fuel cell system of claim 1, said plurality of POX chambers operable to successively partially oxidize the reformate gas until the oxygen/carbon ratio at the startup temperature is in a carbon-free region, the carbon-free region being bounded in part by a carbon formation line shown in FIG. 1.

8. A fuel cell system, comprising:
   a fuel cell having a startup temperature;
   a reformer structured to reform a fuel into a reformate gas; and
   at least one partial oxidation (POX) chamber in fluid communication with the reformer and operable to increase the oxygen/carbon ratio in the reformate gas to a level that permits carbon-free operation of the fuel cell at the startup temperature, wherein during start-up operation of said fuel cell, said at least one POX chamber operates to supply the treated reformate gas to said fuel cell at an oxygen/carbon ratio that yields carbon-free operation at the fuel cell startup temperature.

9. The fuel cell system of claim 8, further comprising:
at least one heat exchanger fluidically coupled to at least one of said reformer and said at least one POX chamber for removing heat from the discharged gas.

10. The fuel cell system of claim 9, wherein said at least one heat exchanger reduces the temperature of the treated reformate gas to approximately 900 degrees (C.).

11. The fuel cell system of claim 8, wherein the reformate gas entering said fuel cell has an oxygen/carbon ratio of at least 1.2 and a temperature of at least 400 degrees (C.).

12. The fuel cell system of claim 8, wherein said reformer is structured as a waterless reformer.

* * * * *